US006865192B1

(12) United States Patent
Barrow

(10) Patent No.: US 6,865,192 B1
(45) Date of Patent: Mar. 8, 2005

(54) INTEGRATED SERVICES HUB SELF CONFIGURATION

(75) Inventor: Matthew K. Barrow, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 843 days.

(21) Appl. No.: 09/747,907

(22) Filed: Dec. 22, 2000

(51) Int. Cl.[7] .................................................. H04J 3/24
(52) U.S. Cl. ......................................... 370/475; 710/104
(58) Field of Search ............................. 370/351–4, 389, 370/400–2, 431, 466, 464, 475, 252; 709/228, 229, 237; 710/104

(56) References Cited

U.S. PATENT DOCUMENTS

| | | | |
|---|---|---|---|
| 5,881,142 A | | 3/1999 | Frankel et al. ............... 379/167 |
| 5,963,620 A | | 10/1999 | Frankel et al. ............ 379/93.05 |
| 6,070,187 A | * | 5/2000 | Subramaniam et al. ...... 709/220 |
| 6,075,784 A | | 6/2000 | Frankel et al. ............... 370/356 |
| 6,118,768 A | * | 9/2000 | Bhatia et al. ................. 370/254 |
| 6,141,339 A | | 10/2000 | Kaplan et al. ............... 370/352 |
| 6,189,102 B1 | * | 2/2001 | Beser .......................... 713/201 |
| 6,286,038 B1 | * | 9/2001 | Reichmeyer et al. ........ 709/220 |
| 6,587,874 B1 | * | 7/2003 | Golla et al. .................. 709/220 |
| 6,657,991 B1 | * | 12/2003 | Akgun et al. ................ 370/352 |

OTHER PUBLICATIONS

U.S. Appl. No. 09/197,044, filed Nov. 20, 1998, Way et al.
U.S. Appl. No. 09/226,575, filed Jan. 7, 1999, Rush et al.
U.S. Appl. No. 09/650,985, filed Aug. 30, 2000, Kaplan et al.
U.S. Appl. No. 09/650,560, filed Aug. 30, 2000, Kaplan et al.
U.S. Appl. No. 09/653,105, filed Aug. 31, 2000, Dale et al.
U.S. Appl. No. 09/675,585, filed Sep. 29, 2000, Goodrich.
U.S. Appl. No. 09/687,683, filed Oct. 12, 2000, Bayerl et al.
U.S. Appl. No. 09/689,365, filed Oct. 12, 2000, Goodrich.
U.S. Appl. No. 09/702,933, filed Oct. 31, 2000, inventor Mahaney.
U.S. Appl. No. 09/711,113, filed Nov. 9, 2000, Goodrich et al.
U.S. Appl. No. 09/727,201, filed Nov. 30, 2000, Mahaney et al.
U.S. Appl. No. 09/745,919, filed Dec. 21, 2000, Bayerl et al.
U.S. Appl. No. 09/745,000, filed Dec. 21, 2000, Bayerl et al.
Cricket Liu & Matt Larson, *IP Address Management: Past, Present and Future,* 2000, pp. 1–8, www.metainfo.com/products/understand.cfm.
Author unknown, *Meta IP/DHCP Overview,* 1998, pp. 1–2, www.metainfo.com/tech/MetaIP/MetaIP40/helpfiles/DHCPOverview.html.
Authur unknown, *DHCP Options dialog box,* 1998, pp. 1–11, www.metainfo.com/tech/MetaIP/MetaIP40/helpfiles/DHCPOverview.html.

* cited by examiner

*Primary Examiner*—David Vincent

(57) ABSTRACT

The present invention discloses a method of automatically downloading configuration files and binary code for a customer premises telecommunications hub. Upon initial power up, the hub sends a DHCP request to the central office DHCP server. The DHCP server sends to the hub an IP address for the hub, the name of an appropriate configuration file, the domain name of a configuration file server and an IP address of a domain name server. The hub requests the IP address of the configuration file server from the domain name server. It then requests the configuration file from the configuration file server, downloads the file and parses it. The hub then requests the binary file named in the configuration file from the configuration file server. The binary code is downloaded and written into flash memory. The hub then resets so that the new binary code is transferred into the operating RAM.

16 Claims, 2 Drawing Sheets

INTEGRATED SERVICES HUB SELF CONFIGURATION

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to a method for initialization of a customer premises telecommunications hub, and more particularly to a method of automatically downloading configuration and binary files through the Internet.

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to and from a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in U.S. Pat. No. 6,22,553 entitled "Multi-Services Communications Device," issued on Aug. 7, 2001, which is incorporated by reference herein in its entirety. The network interface typically is a broadband network interface such as ADSL, T1, or HDSL-2. Examples of user interfaces include telephone interfaces such as plain old telephone system (POTS) ports for connecting telephones, fax machines, modems, and the like to the ISH; computer interfaces such as Ethernet ports for connecting computers and local area networks to the ISH; and video ports such as RCA jacks for connecting video players, recorders, monitors, and the like to the ISH.

In providing telephony services over a broadband network, the ISH communicates with a service manager. This connection between the telephone and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring voltage (sometimes referred to as ring current), ringback, and busy signals. The terms off-hook and off-hook condition as used herein are generic terms meaning that a user device (whether telephone, facsimile machine, modem, etc.) connected to a telephone line is attempting to access and use the line.

The ISH includes a processing core or central processing unit, CPU, which controls these functions. It must exchange data with numerous peripheral devices within and external to the ISH itself. As with any other CPU, it must have appropriate software in order to perform the many required functions. As the controller for the ISH, it requires configuration files to deal with the various interfaces for the POTS ports, Ethernet ports, etc. However, the necessary configuration and binary files are not known until the ISH is installed in a customer premises, such as a private-residence. It is not practical to expect or require individual customers to know how to configure the ISH after it is physically installed. It would be quite expensive to have a trained service technician visit each residence for initializing the system, i.e. loading the necessary software. There is a need for a method for automatically initializing an ISH when it is installed and powered up for the first time.

BRIEF SUMMARY OF THE INVENTION

The present invention provides a method for operating an integrated services hub so that upon installation it automatically initializes itself by locating and downloading the necessary configuration and binary files. Upon first power up, the ISH performs a multistep process. It first issues a DHCP request to a central office, CO, DHCP server. The DHCP server response includes the name of an appropriate configuration file, a domain name referring to a list of configuration file servers where the configuration file is stored and a list of IP addresses for domain name servers which can provide IP addresses for the configuration file servers. The ISH sends a request to a domain name server for the IP addresses of the configuration file servers. The ISH then sends a request to a configuration file server for the configuration file, downloads and parses the file from which it learns the name of the appropriate binary code file. It then requests, receives and downloads the binary code into flash memory. When the process has been successfully completed the ISH is properly configured and goes into the run state.

DETAILED DESCRIPTION OF THE INVENTION

Figure 1:
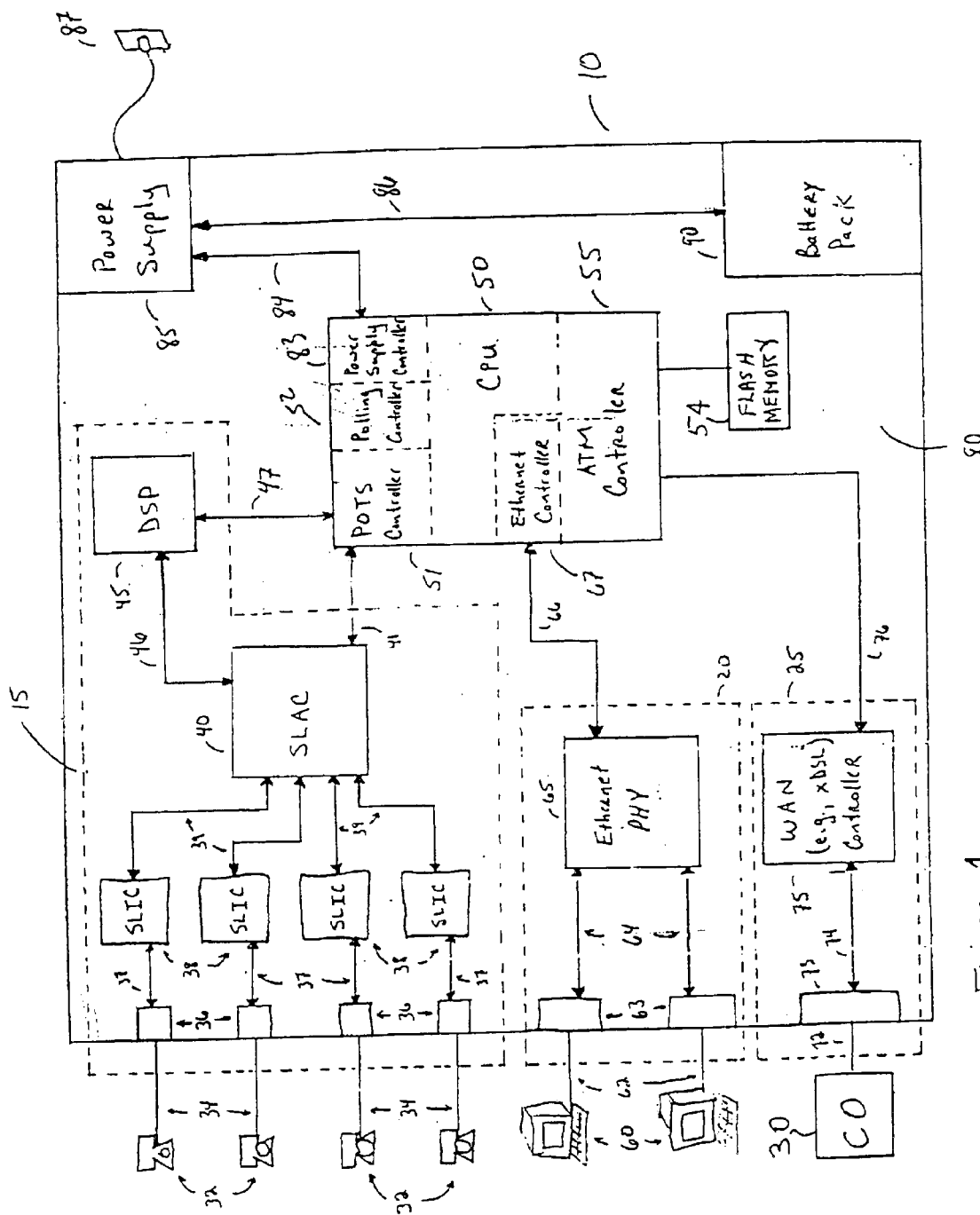
FIG. 1 is a block diagram of an integrated services hub, ISH, according to the present invention; and, FIG. 2 is a flow chart illustrating the automatic downloading of configuration and binary files.

Referring to FIG. 1, integrated services hub (ISH) 10 comprises plain old telephone system (POTS) interface 15, local area network (LAN) interface 20, and wide area network (WAN) interface 25. POTS interface 15 and LAN interface 20 provide user interfaces for the ISH. WAN interface 25 provides the ISH with an interface to a central office, CO, 30 having a broadband packet network such as Sprint's ION network. The CO 30 provides the wide area connection to the Wide Area Network (WAN), i.e. the Internet. In describing the ISH, the components are generally described in carrying out the appropriate function to transmit data from the user interfaces to the WAN, and it should be understood that these components in general perform the reverse function when receiving data from the WAN and transmitting it to the user interfaces.

Telephones 32 are connected by telephone lines 34 to POTS interface 15 by telephone jacks 36, for example industry standard RJ-11 jacks. While four telephones are shown in FIG. 1, any desirable number of telephones may be employed provided that the equipment is appropriately sized to accommodate that number. Telephones 32 are conventional communications devices that typically use the analog telephone format, and similar devices may be substituted such as facsimile machines or modems. Digital format telephones could also be used, with the understanding that the specific circuitry involved would change while providing equivalent functions (for example, detecting hook transitions). Telephone lines 34 are any medium operational to carry telephony signals, and are typically twisted pairs of copper wires.

In addition to telephone jacks 36, POTS interface 15 further comprises subscriber line interface circuits (SLICs) 38, subscriber line access circuit (SLAC) 40, and digital signal processor (DSP) 45. SLICs 38 are connected to telephone jacks 36 by connections 37 on a one-to-one basis. In other words, each telephone connected to the ISH by a telephone jack has a separate and corresponding SLIC. Alternatively, SLICs may incorporate more than one channel each, that is to say a SLIC may be connected to more than one telephone line. The SLICs convert relatively high power, two-line analog signals (also referred to as a tip and ring phone circuit) received from the telephone into relatively low power, four-line analog signals (also referred to as a transmit signal circuit and a receive signal circuit). Furthermore, the SLIC serves as the amplifier that drives power (i.e., voltage and current) onto its corresponding telephone line. Examples of suitable SLICs are integrated circuit chip numbers AM79R79 and AM79R241 produced by Legerity, the former communications division of Advanced Micro Devices (AMD), Inc.

SLAC 40 is connected to SLICs 38 by connections 39. Generally, a SLAC performs three functions: line supervision, signal filtering and manipulation, and analog/digital conversions. The SLAC supervises the lines (and the SLIC corresponding to each line), which includes execution of various protocols for detecting and recognizing an off-hook condition. While a preferred embodiment shown in FIG. 1 uses a SLAC to perform line supervision, SLICs are available that perform line supervision functions, and such enhanced SLICs having integral hook transition monitoring capability could be used. Signal filtering and manipulation is used to conform signals to various industrial or regional/national telephony standards. The SLAC converts four-line analog signals received from the SLICs into four-line digital signals. Thus, the SLAC is an analog to digital (A/D) and digital to analog (D/A) converter, which is also referred to respectively as coding and decoding (i.e., a CODEC). Preferably, the SLAC codes and decodes in compliance with the International Telecommunications Union (ITU) G.711 standard. Typically, a SLAC manages a fixed number of SLICs, and thus the number of SLACs is determined by the number of SLICs. Examples of suitable SLACs are integrated circuit chip numbers AM79Q021 and AM79Q2243 produced by Advanced Micro Devices (AMD), Inc., which are a quad-devices designed to manage four SLICs.

SLAC 40 transmits and receives control data such as line status and signaling to the central processing unit (CPU) 50 by connection 41. The CPU 50 controls the overall function of the ISH and has initialization, management, configuration, and control responsibilities for all of the components and interfaces comprising the ISH. Control software, i.e. the binary code, is stored in flash memory 54. Upon start up or reset of the ISH, the CPU 50 loads the control software into RAM from which it is executed by the CPU 50. Upon execution of the control software, the CPU 50 interacts with various memory mapped peripherals (for example, WAN interface 25). The CPU 50 control software includes a) a POTS control module 51 that controls the telephony functions during operation of the ISH under primary power; b) a polling control module 52 that controls the POTS telephony functions when primary power fails; c) a power supply control module 83 which monitors, either continuously or periodically, the power supply; and d) ATM control module 55 that controls the communications with the network. An example of a suitable CPU is integrated circuit chip number MPC8260 Power QUICC II Communications Processor produced by Motorola, Inc.

Digital signal processor (DSP) 45 compresses (i.e., packetizes) data, typically voice data, received from SLAC 40 by connection 46. DSP 45 transmits compressed data to CPU 50 via connection 47 for transmission to CO 30 by ATM control module 55. An example of a suitable DSP is integrated circuit chip number TMS320VC5402 produced by Texas Instruments, Inc. ATM control module 55 provides the ATM and ML (ATM adaptation layer) layers of the ATM Protocol, which are necessary for ATM-formatted communications with CO 30. In a preferred embodiment, ATM control module 55 is a software module on CPU 50.

Computers 60, for example personal computers located on a residential premises, are connected by connections 62 to LAN interface 20 by LAN connectors 63. LAN connectors 63 are preferably RJ-45 jacks, but any suitable computer connection means may be employed, for example a universal serial bus (USB). While two computers are shown in FIG. 1, any desirable number of computers may be employed provided that the equipment is appropriately sized to accommodate that number.

LAN interface 20 further comprises a LAN physical layer (PHY) device 65 connected to LAN connectors 63 by connections 64. LAN PHY device 65 is preferably an Ethernet PHY, and more specifically a M11 transceiver. CPU 50 contains an Ethernet control module 67, which serves as a media access control (MAC) device and is connected to LAN PHY device 65 by connection 66. The Ethernet PHY and MAC devices support a 10/100 Mbit industry standard MII Ethernet connection.

The CO 30 is connected by connection 72 to WAN interface 25 by WAN connector 73. WAN connector 73 is preferably a RJ-11 jack for ADSL. WAN interface 25 is preferably a universal, xDSL interface, and more preferably an ATM over ADSL interface, xDSL is a generic term encompassing all known varieties of digital subscriber lines (DSL) such as ADSL, U-ADSL, SDSL, HDSL2, RADSL, etc. Other types of WAN interfaces could be used such as T1, cable modem, wireless broadband modem, or ATM-25.

WAN interface 25 further comprises WAN controller 75 connected to WAN connector 73 by connection 74. WAN controller 75 is connected to ATM control module 55 by connection 76. WAN controller 75 is preferably Globespan's G7000 multimode chip set, which further comprises an analog front end (AFE) chip (Globespan GS707X) and a multimode xDSL downloadable DSP and framer chip (Globespan GS707X). The AFE chip provides analog to digital and digital to analog signal conversions. The DSP and framer chip provides digital signal processing and signal transmission framing functions.

POTS interface 15, LAN interface 20, WAN interface 25, CPU 50, and ATM controller 55 are mounted on motherboard 80, which is a printed circuit board (also referred to as a logic board) that provides the various connections between ISH components as discussed above. The motherboard may include expansion slots to accept expansion cards such as an additional POTS card, an ATM-25 interface, a cable modem, etc. Motherboard 80 is connected to power supply 85 and battery pack 90, thereby providing power to the ISH components, the attached analog telephones, and the battery monitoring and charge circuitry. CPU 50 contains a power supply control module 83 connected to power supply 85 by connection 84. A preferred power supply is a universal-input (40400 Hz, 90270V AC RMS) switch mode lead/acid battery float charger with a current-limited output of nominally 13.8 V, and provides charging current to battery pack 90 as represented by connection 86. A preferred battery is a 12 volt DC, 2.5A gel cell (lead-acid) battery, and preferably battery pack 90 comprises two such batteries housed within the ISH.

The power supply is plugged into a standard electrical outlet 87 and serves as the primary power source for the ISH. In the event of a power failure to the electrical outlet, the ISH operates under backup power provided by its battery pack and basic telephone services remain available to the customer for emergency calls.

Each of the controllers illustrated as being part of the CPU 50 are actually software stored as configuration files in RAM and as binary code in flash memory 54. At the time of manufacture of the ISH, its final installation location and configuration are not known and therefore the required configuration files and binary code cannot be known. Instead, the ISH is manufactured with code to perform an automatic downloading of configuration files and binary code according to the steps illustrated in FIG. 2.

Figure 2:
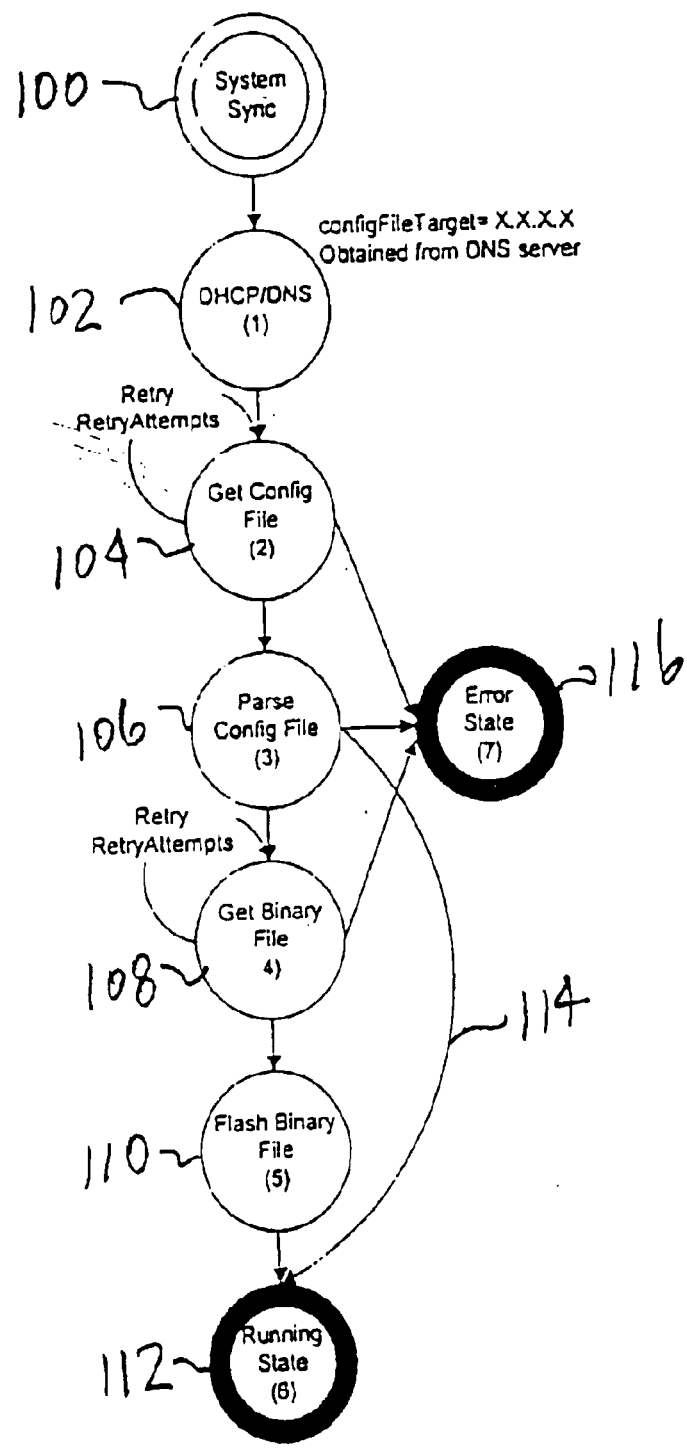

At step 100 shown in FIG. 2, the system sync function is triggered by the start up of the system. Start up means that the system is installed and has power turned on. Start up occurs upon initial installation of the system, but also occurs each time that power to the system is turned off, e.g. when power at outlet 87 is lost for sufficient time to deplete the backup power supply battery pack 90. In step 102, the system issues a DHCP, dynamic host control protocol, request to the CO 30. In response to this request the CO DHCP server provides the ISH with a unique IP address to identify the ISH itself. The DHCP server also supplies the name of the appropriate configuration file, a list of domain names of configuration file servers where the configuration file is stored and a list of IP addresses for domain name servers which can provide IP addresses for the configuration file servers. In the preferred embodiment, the configuration file servers are standard TFTP, trivial file transfer protocol servers.

Since the ISH now has its own IP address, it can send data packets to and receive data packets from any other site on the Internet. In step 104, the ISH first sends a message to a domain name server to obtain the IP addresses of the configuration file servers. It then requests the configuration file from a configuration file server. In step 106, the ISH receives and parses the configuration file. The configuration file contains the name of the appropriate binary file. At the time of manufacture, a basic binary file is loaded into flash memory 54, since otherwise the system cannot start up. But the basic binary file is not suitable for actually running the ISH after it is installed. As part of the parsing process, the ISH checks the binary file name in the configuration file against the name in the flash memory 54. On initial start up, it will not match.

In step 108, the ISH sends another message to the configuration file server requesting the binary file called for in the configuration file. When the new binary file is received, it is stored in flash memory in step 110. In the preferred embodiment, flash memory 54 has spaces allocated to store two binary file images. At the time the ISH is manufactured only one, the basic file, is stored in the first space. When the new binary file is received, it is stored in the second. If the binary file is later replaced with an improved version, it will be written over the first space. Later improved versions are written in space two, then space one, and so on. This process avoids loss of all valid binary files in the event of power loss or other interruption during the process of writing a new binary file to flash memory.

When the ISH started up in step 100, it used the original binary file stored in flash memory 54. The CPU read that binary file from the flash memory 54 and stored it in RAM for use in actual operation of CPU 50. It continues to operate with that version until the copy in RAM is overwritten with new binary code. So, when step 110 is completed, the ISH issues a reset command. When the CPU 50 resets, it loads the new binary file from flash memory 54 into RAM. The reset command also causes the ISH to start over at step 104 where it obtains the configuration file again. When the ISH parses the configuration file at step 106, it will find that the name of the binary file in the configuration file now matches the name of the binary file which it is running. It will then transition directly to the running state at step 112, as indicated by the path 114. Once in the running state, the ISH can operate properly until power loss or some error or an intentional reset command causes the system to reset. The configuration file which was downloaded provides the information needed by the CPU 50 to properly operate the various components and interfaces of the ISH described above.

The above description assumes that each step of the process works as intended on the first try. The ISH supervisor provides some additional steps when the process does not work smoothly. One is an overall timeout for the startup process. If the ISH does not reach the running state 112 or an error state 116 within the set time, the ISH will reset and start the process over. In each of steps 104 and 108, there are provided timeouts which cause the ISH to repeat the step if the requested file is not received within the preselected time. There is also a limit on the number of retry attempts which can be made before the system tries another domain name server or configuration file server. At step 102, the DHCP response provided a list of IP addresses for domain name servers and a list of domain names for configuration file servers. In step 104, if the ISH cannot contact the first domain name server in the set number of retry attempts, it tries the second address, then the third, etc. It will cycle through the list until it succeeds in obtaining a list of IP addresses for the domain name servers. In steps 104 and 108, if the IHS cannot contact the first IP address of a domain name server in the set number of retry attempts, it tries the second, then the third, etc. It will cycle through the list until it succeeds in obtaining the configuration file in step 104 or the binary file in step 108. If the parsing operation in step 106 fails, the system also goes to the error state. Upon entering the error state 116, the system resets and starts the process over.

While the present invention has been illustrated and described with reference to particular equipment and methods of operation, it is apparent that various changes and substitution of equivalent parts can be made within the scope of the present invention as defined by the appended claims.

What I claim as my invention is:

1. A method for initializing a customer premises telecommunications hub having a link to a central office comprising:
    a) upon power up of the hub, sending a DHCP request to a central office DHCP server,
    b) sending a configuration file name, a domain name of a configuration file server and an IP address of a domain name server from the central office DHCP server to the hub,
    c) sending a request for an IP address or a configuration file server from the hub to the domain name server,
    d) sending the IP address of a configuration file server from the domain name server to the hub,
    e) sending a request for the configuration file from the hub to the configuration file server,
    f) sending the configuration file including a control software file name from the configuration file server to the hub,
    g) parsing the configuration file in the hub;
    h) sending a request for the control software from the hub to the configuration file server,
    i) sending the control software from the configuration file serve to the hub, and
    j) storing the control software in memory in the hub.

2. The method according to claim 1, further including: restarting the CPU in the hub.

3. The method according to claim 2 further including
    sending a request for the configuration file from the hub to the configuration file server,
    sending the configuration file, including a control software file name, from the configuration file server to the hub, and
    parsing the configuration file in the hub.

4. The method of claim 1 further including:
    in step b), sending a domain name which refers to a plurality of configuration file servers and IP addresses of a plurality of domain name servers.

5. The method of claim 4 further including:
    in step c), if the request of a first domain name server fails, resending the request to the first domain name server for a preselected number of retry attempts, and, if all such retry attempts fail, sending the request to a second of said plurality of domain name servers.

6. The method of claim 4, further including:
    in step c), sending a request for the IP addresses of the plurality of configuration file servers.

7. The method of claim 6, further including:
    in step e), if the request to a first configuration file server fails, resending the request to the first configuration file server for a preselected number of retry attempts, and, if all such retry attempts fail, sending the request to a second of said plurality of configuration file servers.

8. A method for providing configuration files and control software to a customer premises telecommunications hub having a link to a central office comprising:
    a) upon power up of the hub, sending a DHCP request to a central office DHCP server;
    b) sending a configuration file name, a domain name of a configuration file server and an IP address of a domain name server from the central office DHCP server to the hub;
    c) sending a request for an IP address of a configuration file server from the hub to the domain name server,
    d) sending the IP address of a configuration file server from the domain name server to the hub,
    e) sending a request for the configuration file from the hub to the configuration file server,
    f) sending the configuration file, including a control software file name, from the configuration file server to the hub,
    g) parsing the configuration file in the hub;
    h) sending a request for the control software from the hub to the configuration file server,
    i) sending the control software from the configuration file server to the hub, and
    j) storing the control software in memory in the hub.

9. A method according to claim 8, further including:
    restating the CPU in the hub,
    sending a request for the configuration file from the hub to the configuration file server,
    sending the configuration file, including a control software file name, from the configuration file server to the hub, and
    parsing the configuration file in the hub.

10. The method of claim 8 further including;
    in step b), sending a domain name referring to a plurality of configuration file servers and IP addresses of a plurality of domain name servers.

11. The method of claim 10 further including;

in step c), if the request to a first domain name server fails, resending the request to the first domain name server for a preselected number of retry attempts, and, if all such retry attempts fail, sending the request to a second of said plurality of domain name servers.

12. The method of claim 10, further including:

in step c), sending a request for the IP addresses of the plurality of configuration file servers.

13. The method of claim 12, further including:

in step e), if the request to a first configuration file server fails, resending the request to the first configuration file server for a preselected number of retry attempts, and, if all such retry attempts fail, sending the request to a second of said plurality of configuration file servers.

14. A system for initializing a customer premises telecommunications hub having a link to a central office comprising:

a DHCP server in the central office, a configuration and control software server accessible over the Internet, means in the hub for detecting system power up and sending to the DHCP server in the central office a DHCP request for a configuration file name, a domain name of the configuration and control software server and an Internet address for a domain name server, means in the hub for requesting the configuration file from the configuration and control software server, means for reading a control software file name from the configuration file, comparing it to the name of a control software file in the processor memory, and, if the names are different, for requesting a control software file from the configuration and control software file server.

15. A customer premises telecommunications hub comprising:

means for detecting system power up and sending to a server in a central office a DHCP request for a configuration file name, a domain name for a configuration and control software server and an Internet address for a domain name server, and means for requesting the configuration file from the configuration and control software server, means for reading a control software file name from the configuration file, comparing it to the name of a control software file in the hub and, if the names are different, for requesting a control software file from the configuration and control software file server.

16. The hub of claim 15 further including;

means for storing a control software file in the hub and for resetting the hub.

* * * * *

UNITED STATES PATENT AND TRADEMARK OFFICE
CERTIFICATE OF CORRECTION

PATENT NO. : 6,865,192 B1  
DATED : March 8, 2005  
INVENTOR(S) : Barrow

It is certified that error appears in the above-identified patent and that said Letters Patent is hereby corrected as shown below:

Column 2,  
Line 19, replace "U.S. Pat. No. 6,22,553" by -- U.S. Pat. No. 6,272,553 --.

Column 7,  
Line 50, replace "or a configuration" by -- of a configuration --.  
Line 64, replace "serve to the hub" by -- server to the hub --.

Column 8,  
Line 56, replace "restating the" by -- restarting the --.

Signed and Sealed this

Twenty-fourth Day of May, 2005

JON W. DUDAS  
*Director of the United States Patent and Trademark Office*